United States Patent
Hirtzlin et al.

(10) Patent No.: US 6,356,247 B1
(45) Date of Patent: Mar. 12, 2002

(54) ANTENNA SYSTEM FOR TRACKING MOVING SATELLITES

(75) Inventors: Patrice Hirtzlin, Rennes; Henri Fourdeux, Corps-Nuds; Ali Louzir, Rennes, all of (FR)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/673,895

(22) PCT Filed: Apr. 19, 1999

(86) PCT No.: PCT/FR99/00913
§ 371 Date: Oct. 23, 2000
§ 102(e) Date: Oct. 23, 2000

(87) PCT Pub. No.: WO99/56348
PCT Pub. Date: Nov. 4, 1999

(30) Foreign Application Priority Data

Apr. 23, 1998 (FR) .............................................. 9805111

(51) Int. Cl.[7] .......................... H01Q 19/06; H01Q 15/08
(52) U.S. Cl. ................... 343/911 L; 343/753; 343/757; 343/766; 343/878
(58) Field of Search ........................ 343/911 L, 911 R, 343/753, 757, 766, 754, 758, 763, 765, 909, 878

(56) References Cited

U.S. PATENT DOCUMENTS 4,531,129 A    7/1985   Bonebright et al. ......... 343/754

FOREIGN PATENT DOCUMENTS

| EP | 0707356 | 4/1996 | .......... H01Q/15/02 |
| FR | 2770343 | 4/1999 | ............ H01Q/3/12 |
| WO | 93/02486 | 2/1993 | ............ H01Q/3/08 |

*Primary Examiner*—Don Wong
*Assistant Examiner*—Hoang Nguyen
(74) *Attorney, Agent, or Firm*—Joseph S. Tripoli; Kuniyuki Akiyama

(57) ABSTRACT

The invention relates to a system of antennas for tracking nonsynchronous satellites ($2_1$, $2_2$) along predefined trajectories.

Figure 1:
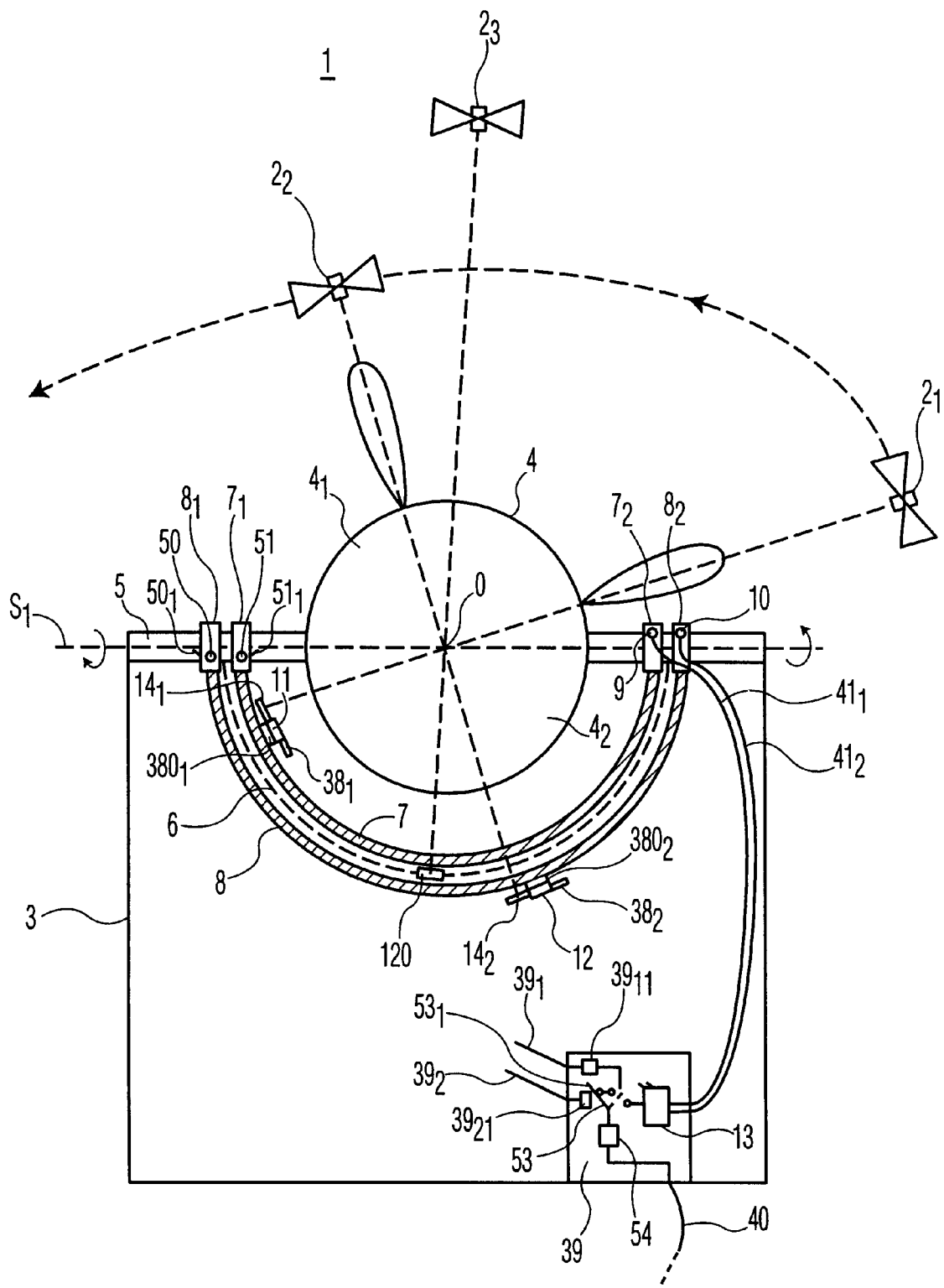

It is characterized in that the said system includes at least first (11) and second (12) transmitter/receiver elements moving in the vicinity of the focusing surface of the system (1) along a line of focal points, the first element (11) actively tracking a first satellite ($2_1$) and the second element (12) standing by to actively track a second satellite ($2_2$).

Particular application to the tracking of nonsynchronous satellites, in particular low- and mid-orbit satellites, and of geostationary satellites.

10 Claims, 5 Drawing Sheets

ANTENNA SYSTEM FOR TRACKING MOVING SATELLITES

The present invention relates to a system for transmitting and/or receiving signals and more particularly to a system of antennas for tracking nonsynchronous satellites.

Hitherto, commercial telecommunications via satellites have been achieved almost entirely via geostationary satellites, which are especially beneficial by virtue of their unchanging relative positions in the sky. However, the geostationary satellite exhibits major drawbacks such as considerable attenuations related to the distance separating the user antennas from the geostationary satellite (of the order of 36,000 kilometers, the corresponding losses then rising to around 205 dB in the Ku band) and transmission lags (typically of the order of 250 ms to 280 ms) thus becoming clearly perceivable and perturbing especially for real-time applications such as telephony, video conferencing, etc. Furthermore, the geostationary orbit, situated in the equatorial plane, poses a visibility problem in respect of the regions at high latitudes, the angles of elevation becoming very small for the regions close to the poles.

The alternatives to employing geostationary satellites are:
- the use of satellites in inclined elliptical orbits, the satellite then being almost stationary above the region situated at the latitude of its apogee for a duration of possibly up to several hours,
- the implementation of constellations of satellites in circular orbits, in particular in low orbit ("Low Earth Orbit" or LEO) or in mid-orbit ("Mid Earth Orbit" or MEO), the satellites of the constellation flying past in turn within visibility of the user terminal for a duration of from some ten minutes to around one hour.

In both cases, service cannot be provided permanently by a single satellite, continuity of service demanding that several satellites fly over the service area one after another.

The document U.S. Pat. No. 4,531,129 describes a Luneberg lens scanning antenna system which includes several sources. However, this system is too complex.

The aim of the invention is therefore to produce a system of antennas for tracking satellites, making it possible to pick up at least two nonsynchronous satellites following one another within the area of visibility of the system and remedying the drawbacks of the prior art systems.

To this end, the subject of the invention is a system for transmitting and/or receiving signals in a communication system employing nonsynchronous satellites, comprising pluridirectional focusing means possessing a focusing surface including a plurality of focal points, comprising a first signals transmitter and/or receiver element and a second signals transmitter and/or receiver element, first means of support of the first element and second means of support of the second element, which means of support are independent of one another and arranged respectively along a first and along a second continuous line of focal points, characterized in that the said system furthermore comprises:
- a first means of displacement of the first element along the first continuous line of focal points and a second means of displacement of the second element along the second line of focal points on the first and second support means respectively,
- means of control of the first and second means of displacement for displacing the first and second elements along the said first and second line of focal points.

In this way, the system according to the invention makes it possible to transmit and/or pick up at least two spatially separate beams and to not suffer from a switching lag when switching from a first satellite to another satellite, which lag would be due to the repositioning of the reception means which sighted the first satellite to a position sighting the second satellite. In the present patent application, the term "active" will be ascribed to any element which exchanges at least a major part of the useful data with a likewise so-called "active" satellite. The term "passive" will designate any other element which exchanges signaling data and little useful data with a so-called "passive" satellite. Since the means of support are independent, the first and second elements can move along the focusing surface without perturbing one another.

According to one embodiment, the system according to the invention comprises means of monitoring the control means so as to determine the transmitter and/or receiver element with which the useful data exchanges are to be performed and so as to switch the latter element to means for processing the signals received and/or transmitted and which are linked to an outside unit for utilizing these signals.

According to one embodiment, cyclically, during a determined period, the two elements are switched to the said processing means.

According to one embodiment, the monitoring means are included within a fixed device of the system.

So that the displacement of the first and second elements should not be disturbed by the presence of cables, the said first and second elements respectively include first and second antennas for receiving and/or transmitting signals and the said device comprises third and fourth transmission and/or reception antennas and in that, while operational, the said first and second elements and the said device are linked by a wireless radioelectric link.

According to one embodiment, the said support means are arranged on either side of the focusing surface.

According to one embodiment, the said focusing means comprise a spherical Luneberg-type lens.

According to one embodiment, the said support means comprise semicircular rails whose centers of curvature almost coincide with that of the lens and are coupled to means of actuation of the said support means.

According to one embodiment, the said actuation means include means of rotation of the first and second support means for azimuthal tracking of the satellites.

According to one embodiment, these means of rotation comprise a rotation shaft passing through the center of the Luneberg lens and around which the said first and second support means are able to revolve.

According to one embodiment, the said first and second support means include rails and in that the said first and second elements are provided with motors enabling them to be moved on the said rails.

According to one embodiment, the monitoring means control the motors of the elements and the means of actuation of the rails.

According to one embodiment, the said first and second elements comprise printed-circuit plate antennas.

According to one embodiment, the said first and second transmission and/or reception elements respectively comprise a frequency converter block for the transmission signals and/or a frequency converter block for the reception signals.

According to one embodiment, the system according to the invention furthermore includes at least one third transmitter and/or receiver element located in the vicinity of one and the same focal point of the system for communication with at least one geostationary satellite.

According to one embodiment, the system according to the invention is intended for tracking nonsynchronous satellites along predefined trajectories and in that the said first and second lines of focal points correspond to the trajectories of a first and a second satellite.

In the present patent application, the term "down signal" shall be interpreted as a signal conveyed in the direction from the satellite to a unit inside a dwelling to which the system is linked, whereas the term "up signal" will relate to a signal conveyed in the direction from the unit inside the dwelling to the satellite.

Figure 2:
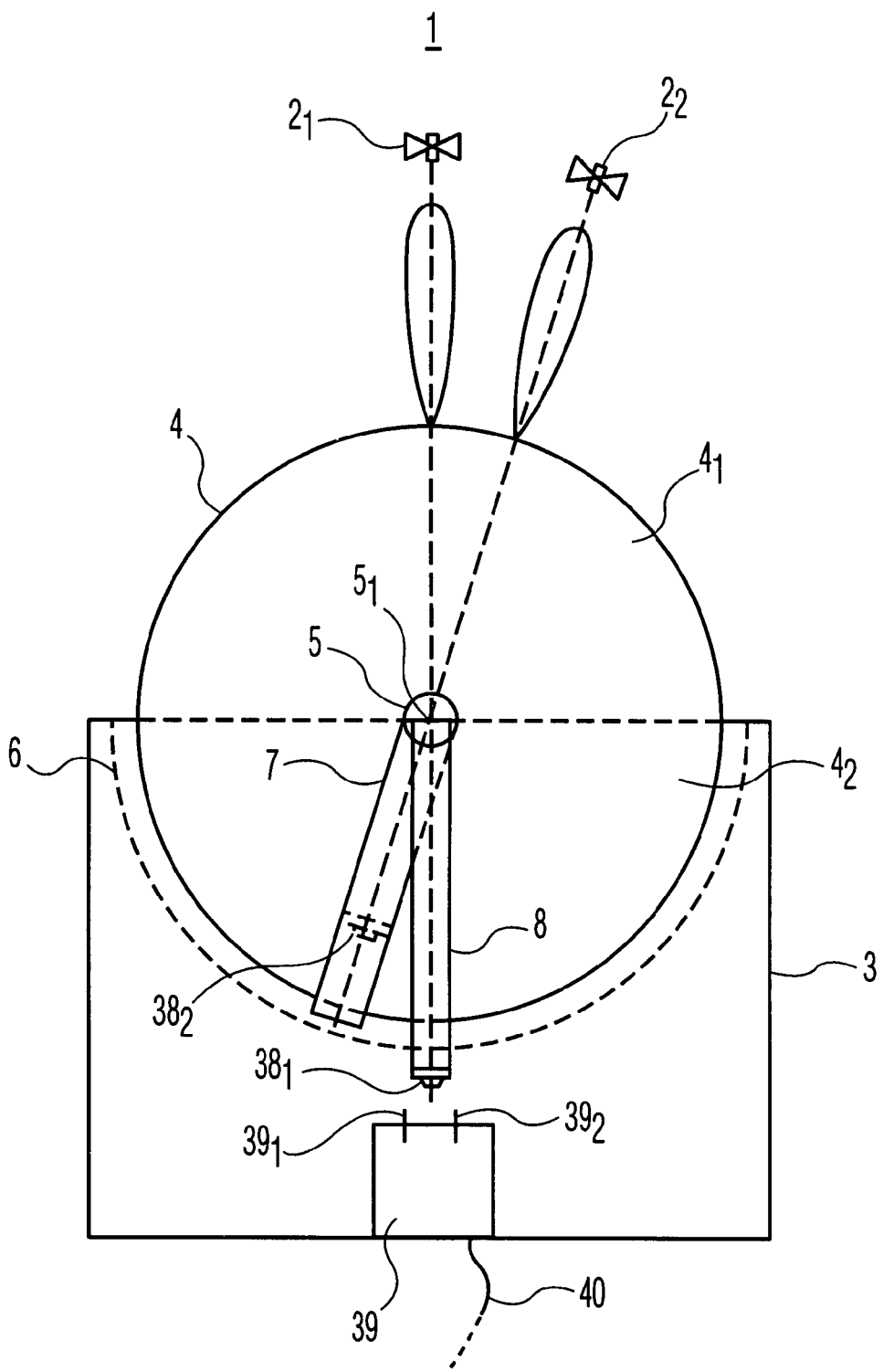
Figure 3A:
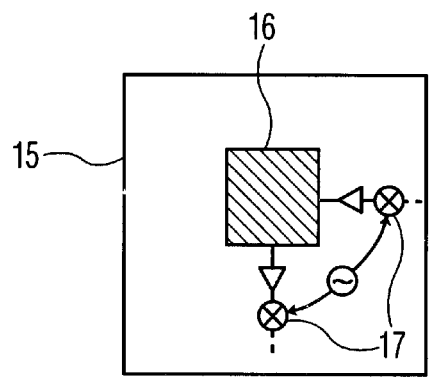
Figure 3B:
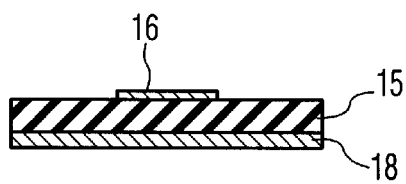
Figure 6:
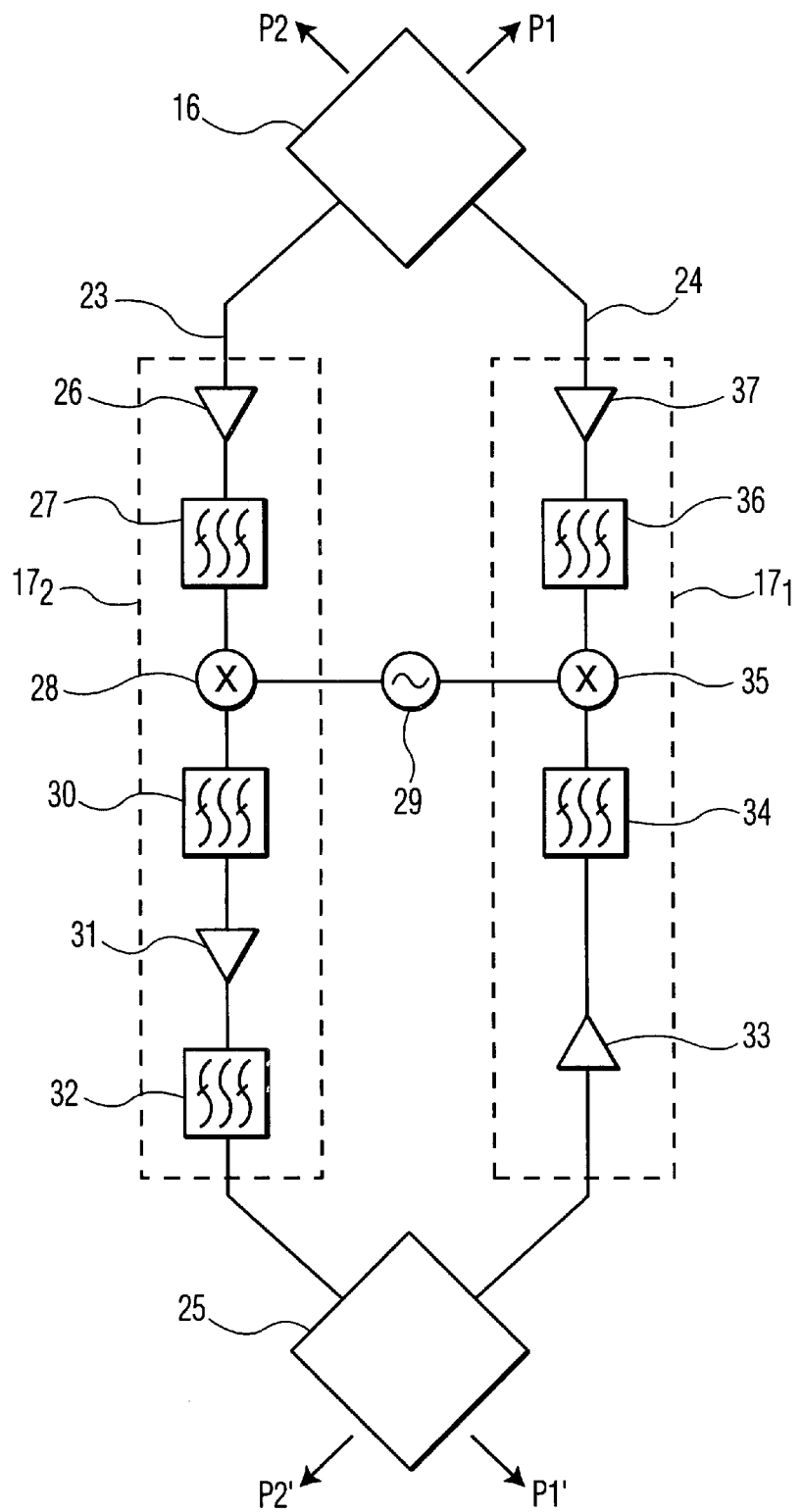

Other characteristics and advantages of the present invention will emerge from the description of the exemplary embodiment which follows, taken by way of nonlimiting example, with reference to the appended figures in which:

FIG. 1 represents a simplified diagram of a vertical section through an embodiment of the system according to the invention, FIG. 2 represents a partial view of the system according to the transverse section of FIG. 1, FIGS. 3.$a$, 4.$a$ and 5.$a$ respectively represent three embodiments of a fifth/sixth transmission/reception antenna, whilst FIGS. 3.$b$, 4.$b$ and 5.$b$ respectively represent an exploded lateral view of the pads illustrated in FIGS. 3.$a$, 3.$b$ and 3.$c$, FIG. 6 represents an embodiment of a transmitter and/or receiver element according to the invention.

To simplify the description, the same references will be used in the latter figures to designate elements which fulfill identical functions.

FIG. 1 represents a simplified diagram of a vertical section through a system 1 according to the invention, intended for tracking nonsynchronous satellites $2_1$, $2_2$, whereas FIG. 2 represents a partial view of the tracking system according to a transverse section of FIG. 1.

According to the embodiment described in FIGS. 1 and 2, the tracking system 1 is integrated into a parallelepipedal housing 3 of an outside unit generally located outside a dwelling (not represented) and within visibility of the space traversed by the satellites $2_1$, $2_2$. This outside unit is generally linked to a unit inside the dwelling which is a decoder. The upper part of the system 1 oriented towards the free radiation space where the satellites $2_1$, $2_2$ are located exhibits a lens of the fixed Luneberg type 4 known per se and two parts of a cylindrical rotation shaft 5 whose axis $5_1$ passes through the center C of the lens 4. The plane transverse to the section of FIG. 1 passing through the axis $5_1$ delimits two hemispheres $4_1$, $4_2$, the hemisphere $4_1$ facing towards the free radiation space whereas the hemisphere $4_2$ lies within the housing 3. The lens 4 possesses a focusing surface 6 on either side of which are located rails 7, 8. The lens 4 is chosen in such a way as to obtain the focusing surface 6 outside the physical surface of the lens 4. The rails 7, 8 have semicircular profiles in the plane of the section of FIG. 1 bordering the focusing surface 6, the centers of which almost coincide with the center O of the lens 4, and whose respective ends are linked to the two parts of the shaft 5 by connection means referenced ($7_1$, $7_2$) and ($8_1$, $8_2$) respectively. The radius of the rail 7 is less than that of the rail 8. Each rail 7, 8 is independent and can revolve about the axis of the shaft 5 by virtue of the motors 9, 10 respectively. The rails 7, 8 are arranged substantially along two lines of focal points.

Two transmitter/receiver elements or relays 11, 12, whose motion is controlled by a control system 13 or microcontroller 13, can move on the rails 7, 8 by virtue of toothed wheels $380_1$, and $380_2$ which mesh with the notched rack of the rails 7, 8 respectively. This microcontroller controls the motors 9, 10 of the rails 7, 8 causing the latter to pivot about their axis of rotation $5_1$, and also controls motors 50, 51 able to control the displacement of the relays 11, 12 along the rails 7, 8. The control of the said motors 50, 51 of the relays 11, 12 is achieved by wireless transmission by means of antennas $50_1$, $51_1$, of signals emanating from the said microcontroller 13 and which are generated from information received by the relays 11, 12 and/or from information known a priori regarding the trajectories of the satellites $2_1$, $2_2$, the geographical location of the system 1, etc. This information is recorded in a memory (not depicted) of the microcontroller 13.

Each relay 11, 12 respectively includes a printed pad $14_1$, $14_2$ for transmitting/receiving signals exchanged with the satellites $2_1$, $2_2$ respectively.

FIGS. 3.$a$, 4.$a$ and 5.$a$ respectively represent three embodiments of the said printed pad $14_1$, $14_2$ for transmission/reception, whereas FIGS. 3.$b$, 4.$b$ and 5.$b$ respectively represent an exploded lateral view of the pads illustrated in FIGS. 3.$a$, 3.$b$ and 3.$c$.

These three embodiments of the printed pad are embodied in the technology known per se of microstrip circuits. FIGS. 3.$a$, 3.$b$ and 3.$c$ depict the use of a substrate layer 15, of Teflon glass for example, on which is disposed a patch 16 facing the radiation space where the satellites $2_1$, $2_2$ are located. The opposite surface of the layer 15 is formed of a metal surface 18 constituting the earth plane of the layer 15.

According to the embodiment of FIGS. 3.$a$ and 3.$b$, the transmission/reception circuits 17 associated with the patch 16 and detailed in FIG. 6 excite the patch 16 in two orthogonal polarizations. According to this embodiment, the patch 16 and the transmission/reception circuits 17 are disposed on the same upper surface of the layer 15. It is understood that one polarization is dedicated to the pathway for the transmission of signals by the system, whilst a second polarization is dedicated to the pathway for the reception of signals by the system.

Figure 4A:
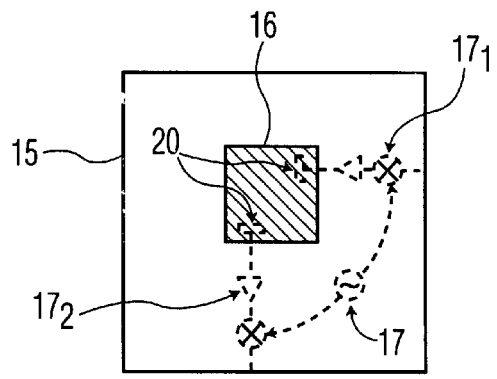
Figure 4B:
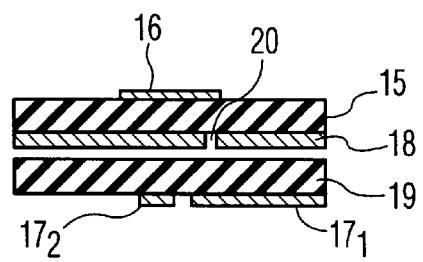

According to the embodiment of FIGS. 4.$a$ and 4.$b$, the printed pad includes two layers 15 and 19. The first substrate layer 15 includes on its upper surface the patch 16 and on its lower surface the earth plane 18 in which coupling slots 20 are made. A second layer 19 is disposed facing the surface 18. The transmission/reception circuits 17 are arranged on the lower surface of the layer 19 opposite the surface in contact with the layer 15.

Figure 5A:
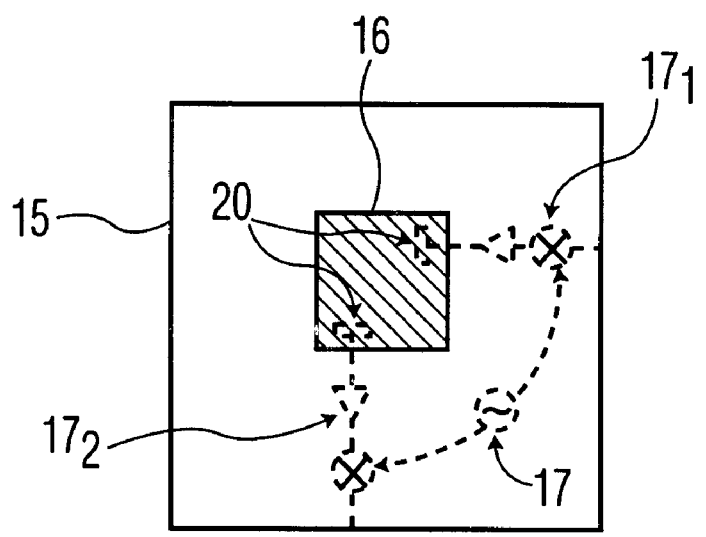
Figure 5B:
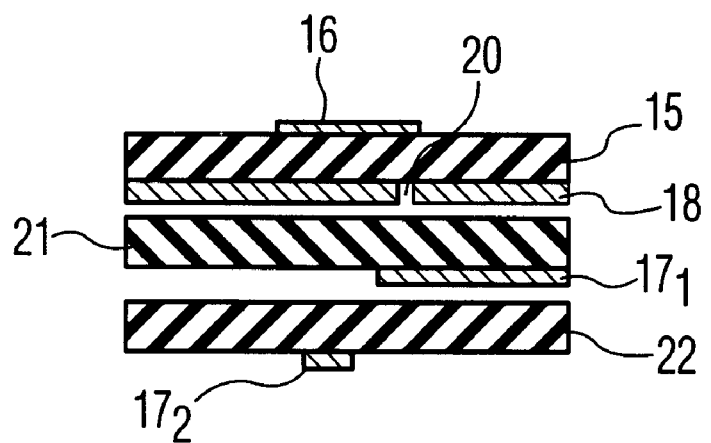

According to the embodiment of FIGS. 5.$a$ and 5.$b$, the printed pad now includes three layers, 15, 21 and 22. As before, the first substrate layer 15 includes on its upper surface the patch 16 and on its lower surface the earth plane 18 in which the coupling slots 20 are made. A second layer 21 is disposed facing the surface 18. The transmission circuit 17, forming part of the circuits 17 is arranged on the lower surface of the layer 21 opposite the surface in contact with the layer 15. A third layer 22 is disposed facing the lower surface of the layer 21. The reception circuit $17_2$ forming part of the circuits 17 exciting the patch 16 in two orthogonal polarizations is arranged on the lower surface of the layer 22 opposite the surface in contact with the layer 21.

According to these last three embodiments, transmission and reception are carried out in two orthogonal polarizations so as to optimize the isolation between a reception pathway 23 for signals originating from the satellites $2_1$, $2_2$, and a transmission pathway 24 for signals to be transmitted to the said satellites $2_1$, $2_2$.

Additionally, the structure which includes a single patch 16 on the first substrate layer 15 can be replaced with a structure which includes two patches separated from a substrate layer, facing one another and resonating at frequencies shifted so as to broaden the frequency passband.

FIG. 6 represents an embodiment of the transmission/reception circuits 17 included within the relays 11, 12 according to the invention. The transmission circuit $17_1$ is on the transmission pathway 24 whilst the reception circuit $17_2$ is located on the reception pathway 23.

In this exemplary embodiment, the transmission/reception circuits 17 are linked on the one hand to the circuits for exciting the first patch 16 for transmitting/receiving signals and on the other hand to the circuits for exciting a second patch 25 for transmitting/receiving signals, the patch 25 also being excited in two orthogonal polarizations. Transmission and reception of signals by the patch 25 can inter alia be carried out according to one of the embodiments described in FIGS. 3.a, 3.b, 4.a, 4.b, 5.a and 5.b. The relays 11, 12 therefore respectively include transmission/reception antennas $38_1$, $38_2$ in the form of printed pads which may be similar to those described in the said figures.

The input of the reception circuit $17_2$ is linked to an output port of the patch 16 exciting the latter along a first side of the patch 16 in a polarization P1 and the output of the circuit $17_2$ is linked to an input port of the patch 25 exciting the latter along a first side of the patch 25 in a polarization P1'. Likewise, the input of the transmission circuit $17_1$ is linked to an output port of the patch 25 exciting the latter along a side orthogonal to the first side of the patch 16 and in a polarization P2' orthogonal to P1' and the output of the circuit $17_1$ is linked to an input port of the patch 25 exciting the latter along a side orthogonal to the first side of the patch 25 and in a polarization P2 orthogonal to P1. The reception circuit $17_2$ includes at its input a low-noise amplifier 26 whose output is linked to a band-pass filter 27 whose passband is centered on the satellite reception frequency. The output of this filter 27 is linked to a first input of a first mixer 28, a second input of which is driven by the pump signal from a local oscillator 29. The output of the mixer 28 is linked to the input of a band-pass filter 30 whose central frequency is centered on the transmission frequency of the patch 25. The signals thus filtered are amplified by a filter 31 then again filtered by a band-pass filter 32 which eliminates the spurious frequencies generated during the conversion involving the mixer 28 and the oscillator 29. The output of the filter 32 is linked to the input of the transmission excitation circuit of the patch 25.

In the same way, the transmission circuit $17_1$ includes at its input an amplifier 33 whose output is linked to a band-pass filter 34 whose passband is centered on the reception frequency of the patch 25. The output of this filter 34 is linked to a first input of a first mixer 35, a second input of which is driven by the pump signal from the local oscillator 29. The output of the mixer 35 is linked to the input of a band-pass filter 36 whose central frequency is centered on the transmission frequency of the patch 16. The signals thus filtered are amplified by a power amplifier 37, the output of which is linked to the input of the transmission feed circuit of the patch 16.

In the bottom thereof the system 1 includes a fixed transmission/reception device referred to hereinafter as a terminal 39 including two transmission/reception antennas $39_1$, $39_2$ communicating with the antennas $38_1$, $38_2$, the said terminal 39 being linked by a coaxial cable 40 to the unit inside the dwelling (not represented) including a television decoder. Each antenna $39_1$, $39_2$ is linked respectively to a frequency conversion circuit $39_{11}$, $39_{21}$ whose output is linked to a terminal $53_1$ of a switch 53. This terminal $53_1$ can switch between the output of the circuit $39_{11}$ and the output of the circuit $39_{21}$ as a function of the visibility of the satellites ($2_1$, $2_2$). This switching is controlled by the monitoring system 13. The other terminal of the switch is linked to a frequency converter circuit 54 whose output is linked to the output cable 40 going to the unit inside the dwelling. It is possible to envisage that, for a predetermined duration, cyclically, for example, the signals received by the two elements are utilized at decoder level, that is to say, for example, the data frames received by the two elements are regarded as useful data and the two elements are switched to the processing circuits 54. The signals are, for example, superimposed so as to optimize the quality of the signals when passing from a first satellite to a second.

Furthermore, the system includes a third fixed transmitter/receiver element or relay 120 located in the vicinity of the focusing surface (6) of the system and able to communicate permanently with a geostationary satellite ($2_3$).

The tracking system I according to the invention can operate in the following manner according to a wholly nonlimiting mode of operation:

The frequency spectrum dedicated to the exchanges between the outside unit and the active satellite can be reduced, for example, during the frequency transposition in the active relay 11, 12, to a band of 700 MHz for reception of signals by the device 39 and a band of 300 MHz for transmission of signals by the device 39, within the framework of satellite transmission/reception systems. It may be established that the major part of the so-called "active band" spectrum is dedicated to the link between the active satellite and the device 39. Only a tiny part of the so-called "passive band" spectrum is dedicated to the exchanges of information relating to the tracking of the satellites and the management of the switching from one satellite to another (or "handover"). Electronic switches (not represented) known per se have the roles of switching the operating band of the active element 11, 12 into the active band whilst the operating band of the passive element 11, 12 is reduced to the passive band.

The satellite about to leave the field of visibility of the system 1 or that about to be in the field of visibility of the latter dispatches in the sequence of data transmitted thereby one or more items of information ordering the system 1 to proceed to the switching of the relays 11, 12. At the moment of this switching, the information is transmitted to the two relays 11, 12. The latter exchange their roles, one becoming active, the other going to standby and taking up position at the optimal spot so as to be within visibility of the next satellite so as to prepare the next switching. The monitoring system 13, which is included in the device 39, controls the respective trajectories of the relays 11, 12 by the action of the toothed wheels $380_1$ and $380_2$ meshing in the notched rack and also controls the actuation means 9, 10 linked, for example, by coaxial cables $41_1$ and $41_2$, to the monitoring system 13. These actuation means are, for example, motors 9, 10. These controls allow adjustment respectively of the angles of elevation and azimuth of the relays 11, 12. Thus, when there is drifting of the trajectories with respect to the preset trajectory of the satellite $2_1$, $2_2$, the monitoring system receiving information from the said satellite $2_1$, $2_2$, as to corrections of trajectories to be made, controls the actuation of the motors 50, 51 for displacing the relays 11, 12 on the rails 7, 8 and the actuation of the motors 9, 10 for displacing the relays 11, 12 in the planes orthogonal to the rails 7, 8 by rotating the latter about their axis $5_1$.

The wireless transmission/reception frequencies of the patch 25 are chosen in such a way as to obtain a spectrum which is sufficient for the reception and transmission signals. In order to avoid any interference, each relay 11, 12 transmits and receives within its own frequency sub-band.

Of course, the invention is not limited to the embodiments as described. Thus, the Luneberg lens can be cylindrical.

Likewise, it is possible to contemplate any other monitoring means for altering the angles of elevation and azimuth of the elements 11, 12 as well as any other location.

Lastly, the management of the switching from the satellite $2_1$ to the satellite $2_2$ can be carried out in any manner other than that contemplated in order to explain the operation of the present invention. It can include all known methods of multiple access to the said at least two satellites $2_1$, $2_2$.

What is claimed is:

1. System for transmitting and/or receiving signals in a communication system employing nonsynchronous satellites, comprising:
   a pluridirectional focusing means possessing a focusing surface including a plurality of focal points,
   a first transmitter and/or receiver element and a second transmitter and/or receiver element,
   a first means of displacement of the first element along a first support arranged along a first line of focal points corresponding to the trajectory of a first nonsynchronous satellite,
   a second means of displacement of the second element along a second support arranged along a second line of focal points corresponding to the trajectory of a second nonsynchronous satellite,
   means of control of the first and second means of displacement able to displace the first and second elements respectively along the said first and second lines of focal points, wherein the pluridirectional focusing means is fixed with respect to the ground and in that the system includes monitoring means, control means for determining the transmitter and/or receiver element with which the useful data exchanges are to be performed and for switching the latter element to means for processing the signals received and/or transmitted.

2. System according to claim 1, wherein it furthermore includes at least one third fixed transmitter and/or receiver element located in the vicinity of a focal point of the system and able to communicate permanently with at least one geostationary satellite.

3. System according to claim 1, wherein the monitoring means are included within a fixed device of the system.

4. System according to claim 3, wherein the said first and second elements respectively include first and second antennas for receiving and/or transmitting signals and the said device comprises third and fourth transmission and/or reception antennas and in that, while operational, the said first and second elements and the said device are linked by a wireless radioelectric link.

5. System according to claim 1, wherein the pluridirectional focusing means consists of a Luneberg-type lens.

6. System according to claim 1, wherein the first and second supports are coupled to means of rotation allowing azimuthal tracking of the satellites.

7. System according to claim 1, wherein the said first and second elements comprise printed-circuit plate antennas.

8. System according to claim 7, wherein the printed circuit is constituted by a substrate which includes on one face a patch excited in two orthogonal polarizations by transmission/reception circuits positioned on the said face and on the other face a layer forming an earth plane.

9. System according to claim 7, wherein the printed circuit is constituted by a first substrate which includes on one face a patch and on the other face a layer forming an earth plane furnished with coupling means and by a second substrate whose face opposite the face in contact with the first substrate receives the transmission and/or reception circuits.

10. System according to claim 9, wherein it furthermore includes a third substrate, the second substrate receiving either the transmission circuits or the reception circuits and the third substrate receiving either the reception circuits or the transmission circuits.

* * * * *